United States Patent
Tohyama

(10) Patent No.: US 11,030,218 B2
(45) Date of Patent: Jun. 8, 2021

(54) COMPUTER SYSTEM AND DATA PROCESSING METHOD

(71) Applicant: Hitachi, Ltd., Tokyo (JP)

(72) Inventor: Kenta Tohyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 205 days.

(21) Appl. No.: 16/327,583

(22) PCT Filed: Aug. 10, 2017

(86) PCT No.: PCT/JP2017/029031
§ 371 (c)(1),
(2) Date: Feb. 22, 2019

(87) PCT Pub. No.: WO2019/030883
PCT Pub. Date: Feb. 14, 2019

(65) Prior Publication Data
US 2019/0179830 A1  Jun. 13, 2019

(51) Int. Cl.
*G06F 16/27* (2019.01)
*G06F 11/34* (2006.01)
(Continued)

(52) U.S. Cl.
CPC ............ *G06F 16/27* (2019.01); *G06F 3/06* (2013.01); *G06F 9/5016* (2013.01);
(Continued)

(58) Field of Classification Search
None
See application file for complete search history.

(56) References Cited

U.S. PATENT DOCUMENTS 8,250,327 B2 * 8/2012 Fujii .................... G06F 3/0608
711/165
10,824,340 B2 * 11/2020 Yeh .................... G06F 12/0246
(Continued)

FOREIGN PATENT DOCUMENTS

| JP | 5853109 B2 | 2/2016 |
| WO | WO 2013/153646 A1 | 10/2013 |
| WO | WO 2015/097774 A1 | 7/2015 |

OTHER PUBLICATIONS

International Search Report (PCT/ISA/210) issued in PCT Application No. PCT/JP2017/029031 dated Sep. 26, 2017 with English translation (three pages).
(Continued)

Primary Examiner — Kim T Nguyen
(74) Attorney, Agent, or Firm — Crowell & Moring LLP

(57) ABSTRACT

Inconsistency in data stored in a plurality of servers that perform replication is prevented. A capacity management unit provides in advance a temporary area for dynamic control of a total capacity, manages a use status of the temporary area of each of a master server and a slave server with a capacity management table, and determines whether a data write request for requesting writing of data is executable or not based on the use status of the temporary area of the master server and the use status of the temporary area of the slave server in the capacity management table of the data requested to be written by the data write request. A data processing unit causes both of the master server and the slave server to execute the data write request when the capacity management unit determines that the data write request is executable, and prevents both of the master server and the slave server from executing the data write request when the data write request is determined to be inexecutable.

10 Claims, 19 Drawing Sheets

(51) Int. Cl.
- *G06F 11/20* (2006.01)
- *G06F 9/50* (2006.01)
- *G06F 16/23* (2019.01)
- *G06F 3/06* (2006.01)
- *G06F 12/00* (2006.01)

(52) U.S. Cl.
CPC ...... *G06F 11/2094* (2013.01); *G06F 11/3442* (2013.01); *G06F 12/00* (2013.01); *G06F 16/2365* (2019.01); *G06F 2201/82* (2013.01); *G06F 2209/5014* (2013.01)

(56) References Cited

U.S. PATENT DOCUMENTS

| | | | |
|---|---|---|---|
| 2013/0111129 A1* | 5/2013 | Maki | G06F 3/0644 711/117 |
| 2015/0046399 A1 | 2/2015 | Fukunaka | |
| 2015/0220612 A1 | 8/2015 | Wada | |
| 2016/0012075 A1 | 1/2016 | Ukai | |
| 2016/0102490 A1* | 4/2016 | Kobler | G07C 9/10 700/9 |
| 2016/0359325 A1* | 12/2016 | Kawata | H02J 3/14 |
| 2016/0364141 A1* | 12/2016 | Yeh | G06F 3/064 |
| 2018/0173598 A1* | 6/2018 | Zeng | G06F 3/0619 |
| 2019/0262333 A1* | 8/2019 | Vasisht | A61K 9/1647 |
| 2019/0271744 A1* | 9/2019 | Huang | G06Q 30/0201 |

OTHER PUBLICATIONS

Japanese-language Written Opinion (PCT/ISA/237) issued in PCT Application No. PCT/JP2017/029031 dated Sep. 26, 2017 (three pages).

* cited by examiner

| key | value |
|---|---|
| key1 | value1 |
| key2 | value2 |
| key3 | value3 |

| Server device ID | Temporary-area size | Used size |
|---|---|---|
| 1 | 10 MB | 0 MB |
| 2 | 10 MB | 0 MB |

| Range ID | Temporary-area size upper-limit value | Temporary-area size | Used size | Number of requests | Maximum request-use size |
|---|---|---|---|---|---|
| 1 | 10 MB | 10 MB | 0 MB | 1,000 | 1 KB |
| 3 | 20 MB | 20 MB | 0 MB | 2,000 | 1 KB |

| Error detection time |
|---|
| 10 seconds |

| Time point | Range ID | Number of requests (number of requests/sec) |
|---|---|---|
| 2017/1/1 00:00:01 | 1 | 1,000 |
| 2017/1/1 00:00:01 | 3 | 2,000 |
| 2017/1/1 00:00:02 | 1 | 1,500 |
| 2017/1/1 00:00:02 | 3 | 500 |

COMPUTER SYSTEM AND DATA PROCESSING METHOD

TECHNICAL FIELD

The present invention relates to an information system for multiplexing data.

BACKGROUND ART

As a type of distributed databases, there is a distributed Key-Value store (KVS). In KVS, a "Value" of data to be stored is associated with an arbitrary "Key", and the Key and the Value are stored as a pair. When the stored data is retrieved, the Value can be retrieved by specifying the Key. The distributed KVS allows the Value to be stored in a plurality of servers in a distributed manner on the basis of the Key, and thus enabling easy scale-out of the system. Through addition of servers, the processing speed can be easily increased.

Further, in the distributed KVS, replication is utilized. The replication is a technology for multiplexing data. In the replication, master data and replica data that is reproduction of the master data are stored in different servers, and the data is reproduced between these servers.

In a system in a hetero environment in which servers have different capacities, however, a server in which master data is stored (master server) and a server in which replica data is stored (slave server) may have different free capacities.

Further, the master server and the slave server may have different free capacities also when the amount of data is uneven between the servers. When a data write request for requesting data writing is issued under the state where the master server and the slave server have different free capacities, either of the master server and the slave server may not have a free capacity enough to execute the request (capacity shortage). The data write request fails in the server in which the capacity shortage has occurred while the data write request succeeds in the server in which the capacity shortage has not occurred. When the data write request fails, requested data is not written in the server. When the data write request succeeds, the requested data is written in the server. When the data is written in one of the master server and the slave server while the same data is not written in the other server, inconsistency occurs between the master data and the replica data.

PTL 1 discloses a method for dynamically changing a range with the use of server load information, to thereby improve the usage efficiency of the storage capacity of a server under a hetero machine environment.

CITATION LIST

Patent Literature

[PTL 1]
Japanese Patent No. 5853109

SUMMARY OF INVENTION

Technical Problem

With the method of PTL 1, however, a difference in free capacity between the servers cannot be completely prevented. A data write request for requesting data registration may succeed in one of the master server and the slave server while the data write request may fail in the other server. In such a case, inconsistency occurs between the master data and the replica data. In a system that utilizes the replication, data inconsistency between a plurality of servers that are a master server and slave servers is inconvenience.

It is an object of the present invention to provide a technology for preventing inconsistency in data stored in a plurality of servers that perform replication.

Solution to Problem

A computer system according to an aspect of the present invention is a computer system configured to allocate master data and replica data that is reproduction of the master data in a plurality of server devices in a distributed manner, the computer system including: a capacity management unit configured to configure a storage area management range covering the plurality of server devices as a range, provide in advance, in the range, a temporary area for dynamic control of a total capacity to a master server that is one of the plurality of server devices in which the master data is allocated and a slave server that is one of the plurality of server devices in which the replica data is allocated, manage a use status of the temporary area of each of the master server and the slave server with a capacity management table, and determine whether a data write request for requesting writing of data is executable or not based on the use status of the temporary area of the master server and the use status of the temporary area of the slave server in the capacity management table of a range to which the data requested to be written by the data write request belongs; and a data processing unit configured to cause both of the master server and the slave server to execute the data write request when the capacity management unit determines that the data write request is executable, and prevent both of the master server and the slave server from executing the data write request when the data write request is determined to be inexecutable.

Advantageous Effects of Invention

According to the present invention, even when the master server and the slave server have different free capacities, a request that succeeds in one server can also succeed in another server and a request that fails in one server can also fail in another server on the basis of the determination result, and hence the data consistency is improved, with the result that the inconsistency in data stored in the plurality of servers that perform the replication can be prevented.

BRIEF DESCRIPTION OF DRAWINGS

FIG. 4 is a diagram illustrating a data structure in a data store.

FIG. 7 is a diagram illustrating an example of cluster management information.

FIG. 8 is a diagram illustrating an example of statistical information.

DESCRIPTION OF EMBODIMENTS

Now, an embodiment of the present invention is described with reference to the drawings.

Figure 1:
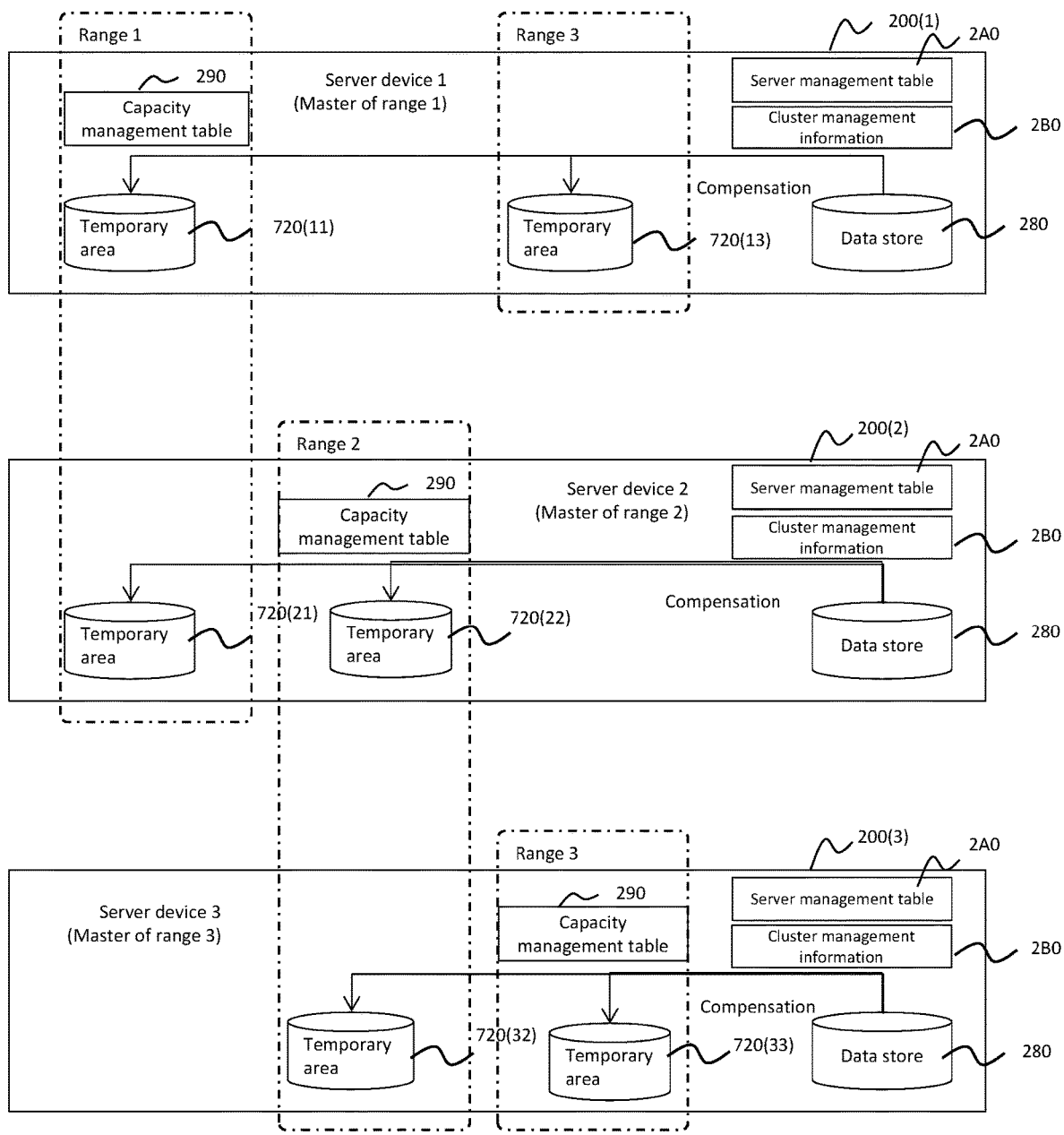
FIG. 1 is a diagram illustrating data replication in a computer system according to the present embodiment.

FIG. 1 is a diagram illustrating data replication in a computer system according to the present embodiment.

An information system according to the present embodiment includes a plurality of server devices 200. The plurality of server devices 200, which are included in the information system, configure the cluster of storage devices. Cluster management information 2B0 for managing the cluster is configured in each of the server devices 200.

Each of the server devices 200 includes a data store 280 that is a distributed KVS that associates a Value of data to be stored with an arbitrary Key, thereby storing the Key and the Value as a pair. In the distributed KVS, as the replication, master data and replica data are stored in the different server devices 200 in a distributed manner.

A storage area management range covering the plurality of server devices 200 included in the cluster is configured as a range. Each range includes a temporary area 720 that is a storage area provided to each of the server devices 200. In each range, the master data and the replica data are allocated to the temporary areas 720 of the plurality of server devices 200 in a distributed manner.

One of the server devices 200 in the range serves as a master server and the remaining server devices 200 serve as slave servers. The master server has a role of receiving a request from a client device 100, and controlling each of the server devices 200 in the range to execute the request. Master data is stored in the temporary area 720 of the master server, and replica data corresponding to the master data is stored in the temporary area 720 of the slave server. The master server has a capacity management table 290 for managing the storage capacity of the temporary area 720 of each of the server devices 200 in the range. When an error occurs in the master server, failover occurs so that another server device 200 serves as a new master server.

For example, in a range 1 configured to cover a server device 200(1) and a server device 200(2), the capacity management table 290 is configured in the server device 200(1), and the master data is stored in a temporary area 720(11) of the server device 200(1) while the replica data is stored in a temporary area 720(21) of the server device 200(2).

In a similar manner, in a range 2 configured to cover the server device 200(2) and a server device 200(3), the capacity management table 290 is configured in the server device 200(2), and the master data is stored in a temporary area 720(22) of the server device 200(2) while the replica data is stored in a temporary area 720(32) of the server device 200(3).

In a similar manner, in a range 3 configured to cover the server device 200(3) and the server device 200(1), the capacity management table 290 is configured in the server device 200(3), and the master data is stored in a temporary area 720(33) of the server device 200(3) while the replica data is stored in a temporary area 720(13) of the server device 200(1).

Each of the server devices 200 has a server management table 2A0 for managing information on the temporary area that the server device 200 provides for each range.

Figure 2:
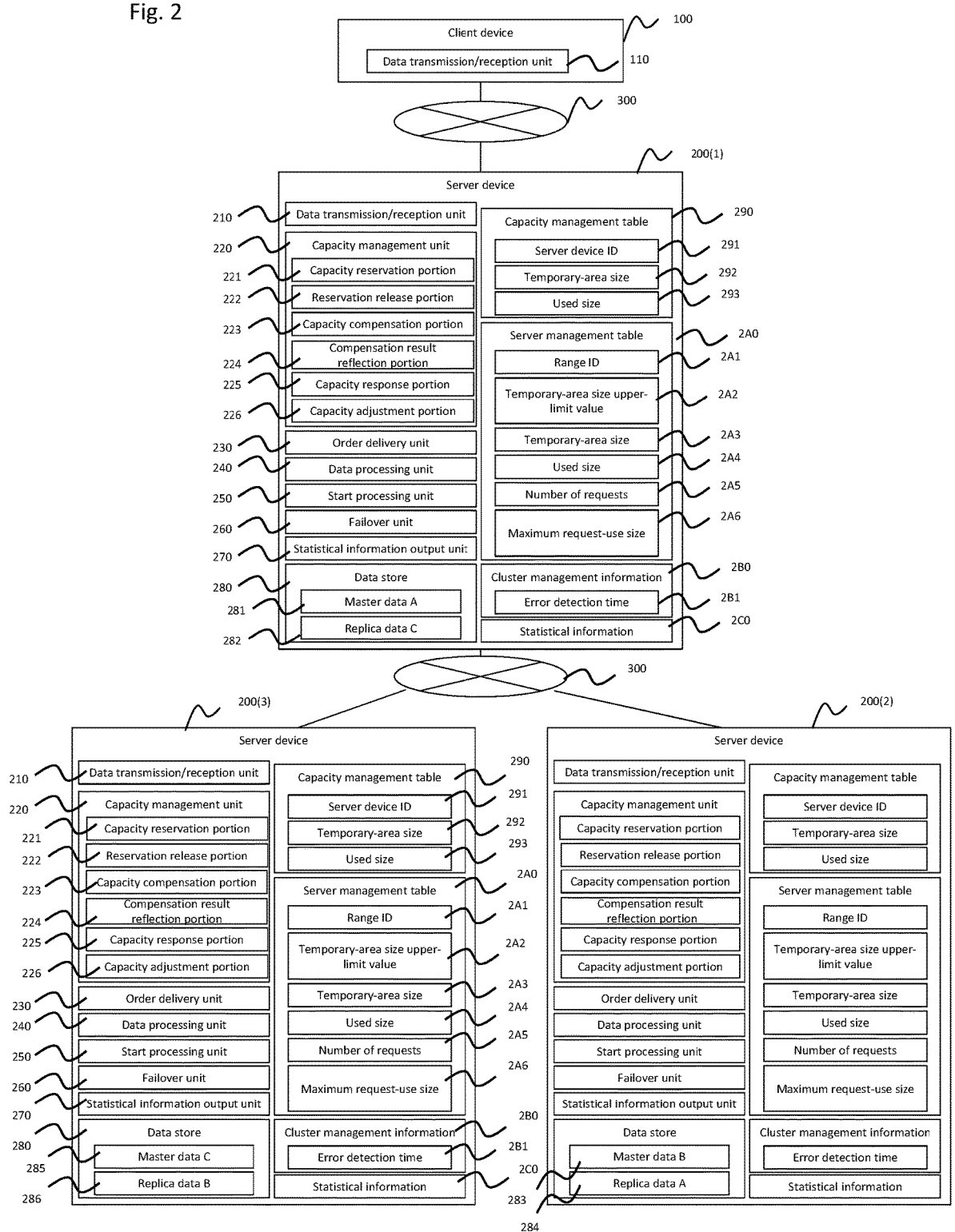
FIG. 2 is a block diagram illustrating the configurations of an information system and server devices according to the present embodiment.
Figure 3:
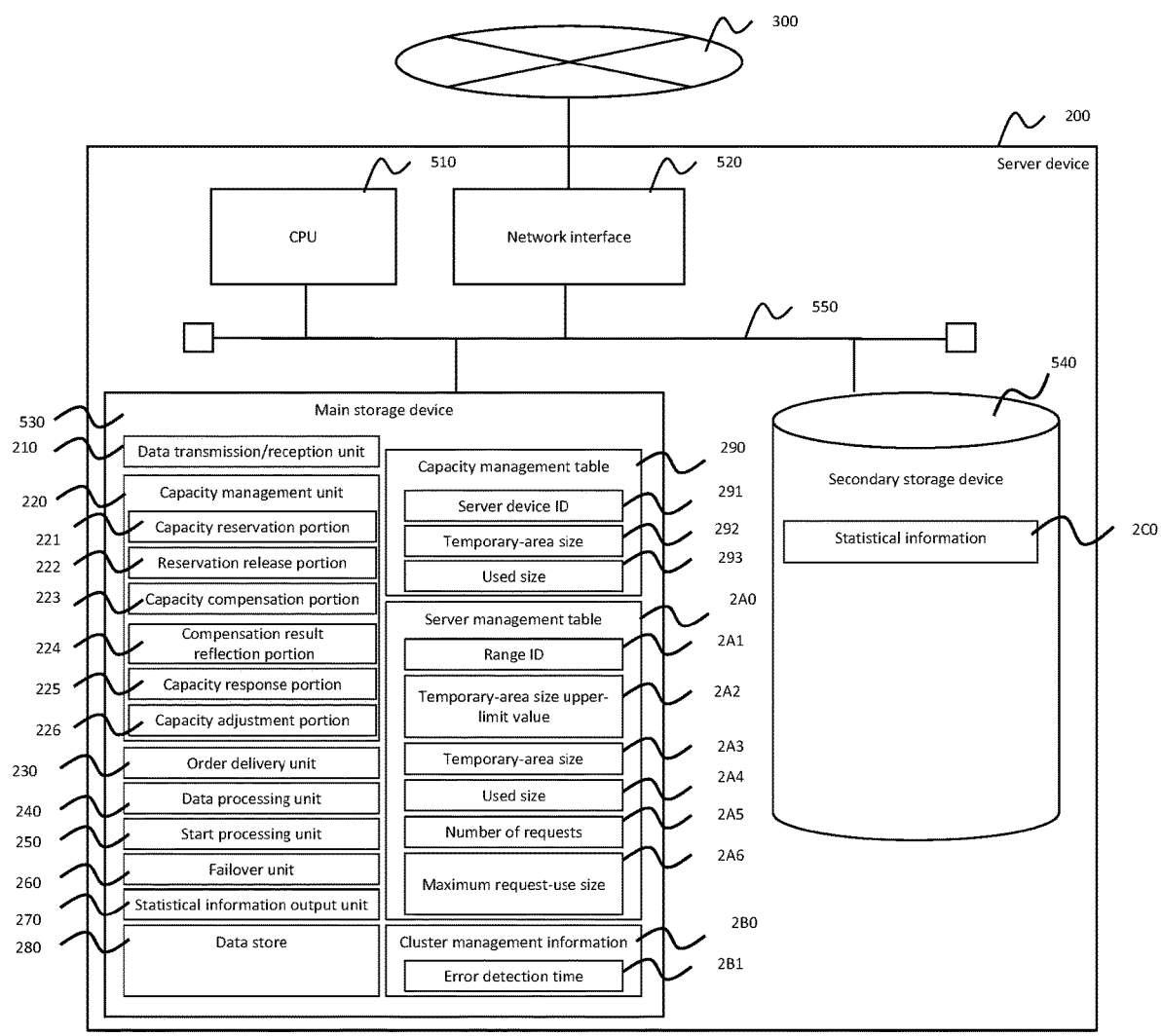
FIG. 3 is a block diagram illustrating the hardware configuration of the server device of the present embodiment.

FIG. 2 is a block diagram illustrating the configurations of the information system and the server devices according to the present embodiment. FIG. 3 is a block diagram illustrating the hardware configuration of the server device of the present embodiment.

With reference to FIG. 2, the information system includes the client device 100 and the server devices 200. The plurality of server devices 200 are connected to each other via a communication network 300. The client device 100 is also connected to the server devices 200 via the communication network 300. The client device 100 can access each of the server devices 200 via the communication network 300, thereby recording data or retrieving recorded data.

The client device 100 includes a data transmission/reception unit 110. The data transmission/reception unit 110 transmits or receives data via the communication network 300.

The server device 200 includes a data transmission/reception unit 210, a capacity management unit 220, an order delivery unit 230, a data processing unit 240, a start processing unit 250, a failover unit 260, a statistical information output unit 270, and a data store 280, and manages the capacity management table 290, the server management table 2A0, and the cluster management information 2B0. The capacity management unit 220 includes a capacity reservation portion 221, a reservation release portion 222, a capacity compensation portion 223, a compensation result reflection portion 224, a capacity response portion 225, and a capacity adjustment portion 226. The capacity management table 290 includes a server device ID 291, a temporary-area size 292, and a used size 293. The server management table 2A0 includes a range ID 2A1, a temporary-area size upper-limit value 2A2, a temporary-area size 2A3, a used size 2A4, a number of requests 2A5, and a maximum request-use size 2A6. The cluster management information 2B0 includes error detection time 2B1.

The data store 280 stores, on a temporary area (not shown), the master data and/or the replica data. For example, the data store 280 of the server device 200(1) stores master data A 281 and replica data C 282. In a similar manner, the data store 280 of the server device 200(2) stores master data B 283 and replica data A 284. In a similar manner, the data store 280 of the server device 200(3) stores master data C 285 and replica data B 286.

Processing that each of the data transmission/reception unit 210, the capacity management unit 220, the order delivery unit 230, the data processing unit 240, the start processing unit 250, the failover unit 260, and the statistical information output unit 270 executes is described later with reference to the flowcharts. The capacity management table 290, the server management table 2A0, the cluster management information 2B0, and the statistical information 2C0 are also described later.

With reference to FIG. 3, the server device 200 includes, as hardware, a CPU 510, a network interface 520, a main storage device 530, a secondary storage device 540, and a bus 550. The CPU 510, the network interface 520, the main storage device 530, and the secondary storage device 540 are connected to the bus 550. The CPU 510 can execute processing by using the network interface 520, the main storage device 530, and the secondary storage device 540.

The data transmission/reception unit 210, the capacity management unit 220, the order delivery unit 230, the data processing unit 240, the start processing unit 250, the failover unit 260, and the statistical information output unit 270 are stored in the main storage device 530 as software programs. The CPU 510 executes the software programs to achieve the function of each unit.

The data store 280 is provided to the main storage device 530, and the capacity management table 290, the server management table 2A0, and the cluster management information 2B0 are stored in the main storage device 530. However, the data in the data store 280 may partly or entirely be provided to the secondary storage device 540 for the purpose of data backup. Further, the data in the data store 280 may partly or entirely be provided to the secondary storage device 540 when the capacity of the data increases.

FIG. 4 is a diagram illustrating a data structure in the data store. Data is stored in the data store 280 of the server device 200 with the distributed KVS. In KVS, a value of data to be stored is associated with an arbitrary key, and one pair is stored in the data store 280. In which of the data stores 280 of the plurality of server devices 200, the data has been stored can be determined on the basis of a distribution function.

With reference to FIG. 4, in the data store 280, a pair of a key and a value is record. For example, a value value1 is associated with a key key1, and the value value1 and the key key1 are recorded in the data store 280 as a pair. In a similar manner, a value value2 is associated with a key key2, and the value value2 and the key key2 are recorded in the data store 280 as a pair. A value value3 is associated with a key key3, and the value value3 and the key key3 are recorded in the data store 280 as a pair.

Figure 5:
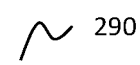
FIG. 5 is a diagram illustrating an example of a capacity management table.

FIG. 5 is a diagram illustrating an example of the capacity management table. The capacity management table 290 is a table that is provided to each range, and stores information on the storage capacity of the temporary area provided to the range. The capacity management table 290 is provided to the server device 200 that is a master in a range. The server device 200 in which the master data is stored in a range is a master in the range. With reference to FIG. 5, in the capacity management table 290, the server device ID 291 for identifying each server that provides the temporary area to a range, the size (temporary-area size) 292 of the temporary area that the server provides to the range, and the size (used size) 293 of a storage area that has already been used in the temporary area are record in association with each other.

For example, the server device having a server device ID of 1 (server device 200(1) in FIG. 1) has a temporary area of 10 MB (temporary area 720(11) in FIG. 1) for the range 1. The used size of the temporary area 720(11) is 0 MB, that is, the temporary area 720(11) has not been used yet. Further, the server device having a server device ID of 2 (server device 200(2) in FIG. 1) has a temporary area of 10 MB (temporary area 720(21) in FIG. 1) for the range 1. The used size of the temporary area 720(21) is 0 MB, that is, the temporary area 720(21) has not been used yet.

Figure 6:
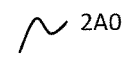
FIG. 6 is a diagram illustrating an example of a server management table.

FIG. 6 is a diagram illustrating an example of the server management table. The server management table 2A0 is provided to each of the server devices 200, and stores information on the temporary area that the server device 200 provides to each range. With reference to FIG. 6, in the server management table 2A0, the range ID 2A1 for identifying a range to which the server provides the temporary area 720, the upper-limit value (temporary-area size upper-limit value) 2A2 of a size that can be provided to the range as the temporary area 720, the size (temporary-area size) 2A3 of the temporary area 720 that is actually provided to the range, the size (used size) 2A4 of a storage area used in the temporary area 720, the number of requests (number of requests) 2A5 that are processed in the temporary area 720, and the maximum size (maximum request-use size) 2A6 of a storage area that one request uses are recorded in association with each other.

For example, the server device 200(1) can provide up to 10 MB of the temporary area 720 to the range having the range ID of (range 1), and actually provides 10 MB of the temporary area 720 (temporary area 720(11) in FIG. 1). The used size of the temporary area 720(11) is 0. The temporary area 720(11) deals with 1,000 requests from a time point of previous statistical information output processing executed by the statistical information output unit 270. Further, of the requests that the temporary area 720(11) has dealt with so far, the request that has used the maximum size of the storage area has used 1 KB. In a similar manner, the server device 200(1) can provide up to 20 MB of the temporary area 720 to the range having the range ID of 3 (range 3), and actually provides 20 MB of the temporary area 720 (temporary area 720(13) in FIG. 1). The used size of the temporary area 720(13) is 0. The temporary area 720(13) deals with 2,000 requests from a time point of the previous statistical information output processing executed by the statistical information output unit 270. Further, of the requests that the temporary area 720(13) has dealt with so far, the request that has used the maximum size of the storage area has used 1 KB. The statistical information output processing that the statistical information output unit 270 executes is described later.

Figure 7:
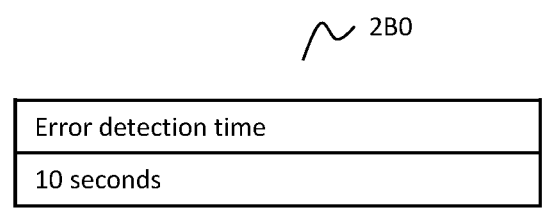

FIG. 7 is a diagram illustrating an example of the cluster management information. The cluster management information 2B0 is provided to each of the server devices 200 that configure the cluster. The cluster management information 2B0 includes parameters that are used in the server devices 200, which configure the cluster. With reference to FIG. 7, the time (error detection time) 2B1 required for error detection is set. The temporary area 720 has a size enough to deal with requests that are issued in the error detection time 2B1. In FIG. 7, the error detection time 2B1 is set to a specific time of 10 seconds as an example.

FIG. 8 is a diagram illustrating an example of the statistical information. The statistical information 2C0 is statistical information on processing performed in the server device 200 for each range. In the present embodiment, as the statistical information 2C0, the number of requests that are processed per second in the server device 200 for each range is acquired. FIG. 8 exemplifies the statistical information 2C0 acquired in the server device 200(1).

For example, information acquired at a time point 2017/1/1 00:00:01 indicates that 1,000 requests have been processed every second in the range having the range ID of 1 (range 1). Further, information acquired at a time point 2017/1/1 00:00:01 indicates that 2,000 requests have been processed every second in the range having the range ID of 3 (range 3). Further, information acquired at a time point 2017/1/1 00:00:02 indicates that 1,500 requests have been processed every second in the range 1. Further, information acquired at a time point 2017/1/1 00:00:02 indicates that 500 requests have been processed every second in the range 3.

<Data Transmission/Reception>

The data transmission/reception unit 110 of the client device 100 determines one of the plurality of server devices 200, in which data are stored in a distributed manner with the distributed KVS, as the server device 200 that is a destination of a request, and transmits the request to the determined server device 200. Here, the data transmission/reception unit 110 can calculate the server device 200 that is the destination of the request on the basis of the output value of the distribution function that is obtained by inputting a key to the distribution function. The request transmitted from the data transmission/reception unit 110 is received by the data transmission/reception unit 210 of the server device 200 to be processed in the server device 200. After that, a response is transmitted from the data transmission/reception unit 210 of the server device 200 to the client device 100. The data transmission/reception unit 110 receives the response transmitted from the data transmission/reception unit 210 of the server device 200.

Figure 9:
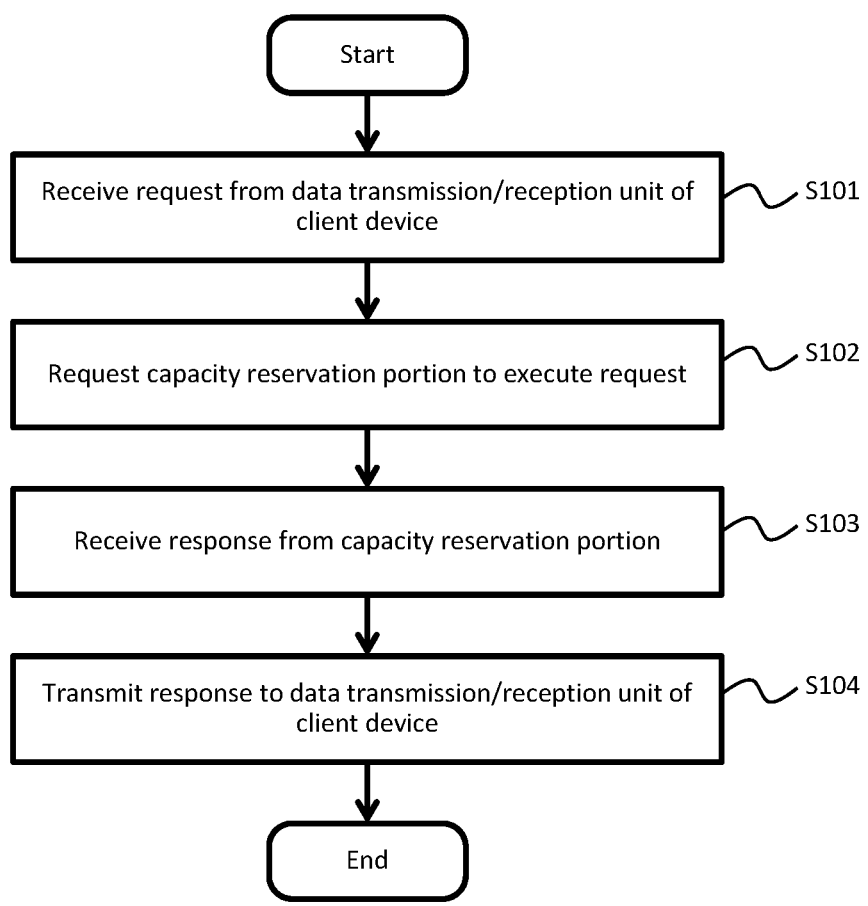
FIG. 9 is a flowchart of data transmission/reception processing by a data transmission/reception unit of the server device.

FIG. 9 is a flowchart of data transmission/reception processing by the data transmission/reception unit of the server device. The data transmission/reception processing is processing that the data transmission/reception unit 210 of the master server executes.

In Step S101, the data transmission/reception unit 210 of the master server first receives a request from the data transmission/reception unit 110 of the client device 100. Next, in Step S102, the data transmission/reception unit 210 requests the capacity reservation portion 221 of the capacity management unit 220 to execute the request. Capacity reservation processing that the capacity reservation portion 221 executes here is described later.

After that, in Step S103, the data transmission/reception unit 210 receives a response corresponding to the request from the capacity reservation portion 221 that has ended execution of the request. Next, in Step S104, the data transmission/reception unit 210 transmits the received response to the data transmission/reception unit 110 of the client device 100.

Figure 10:
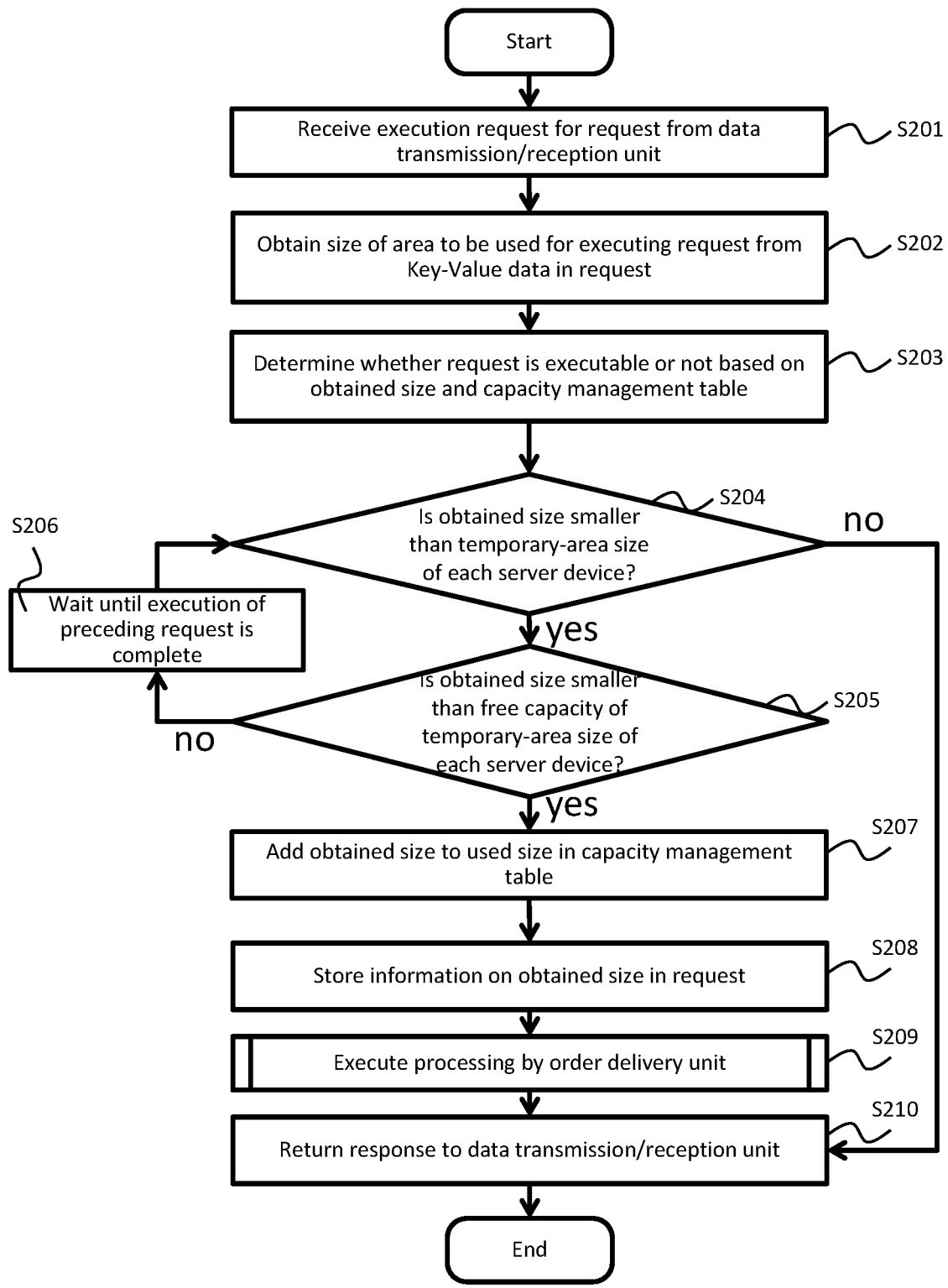
FIG. 10 is a flowchart of capacity reservation processing by a capacity reservation portion.

FIG. 10 is a flowchart of the capacity reservation processing by the capacity reservation portion. The capacity reservation processing is processing that the capacity reservation portion 221 of the master server executes.

In Step S201, the capacity reservation portion 221 receives the request for executing the request from the data transmission/reception unit 210. In Step S202, the capacity reservation portion 221 acquires Key data and Value data in the request to measure the size of the request, thereby obtaining the size of the storage area to be used for executing the request.

In addition, in Step S203, the capacity reservation portion 221 determines whether the request is executable or not on the basis of the size obtained in Step S202 and the information registered in the capacity management table 290.

Specifically, in Step S204, the capacity reservation portion 221 determines whether or not the size obtained in Step S202 is smaller than the temporary-area sizes 292 of all of the server devices 200 included in the range. When the size obtained in Step S202 is smaller than the temporary-area sizes 292 of all of the server devices 200, the request is executable.

When the request is executable, in Step S205, the capacity reservation portion 221 determines whether or not the size obtained in Step S202 is smaller than the free capacities of the temporary areas 720 of all of the server devices 200. The free capacity of the temporary area 720 can be calculated by Expression (1).

(Free capacity of temporary area)=(temporary-area size 292)−(used size 293)  (1)

When any one of the server devices 200 has the temporary area with a free capacity smaller than the size calculated in Step S202 (no in Step S205), in Step S206, the capacity reservation portion 221 waits until execution of a preceding request is complete, and the processing returns to Step S204. When the size obtained in Step S202 is smaller than the free capacities of the temporary areas 720 of all of the server devices 200 (yes in Step S205), in Step S207, the capacity reservation portion 221 adds the size obtained in Step S202 to the used size 293 in the capacity management table 290. This is processing of reserving the storage area of the temporary area 720 on the capacity management table 290 to execute the request with the use of the storage area. Next, in Step S208, the capacity reservation portion 221 stores information on the size obtained in Step S202 in the request.

In addition, in Step S209, the capacity reservation portion 221 controls the order delivery unit 230 to execute order delivery processing. The order delivery unit 230 delivers the request to the data processing unit 240 through total order delivery. When the delivery is complete, the order delivery unit 230 returns a response to the capacity reservation portion 221 on the basis of the delivery result, without waiting completion of the data processing unit 240. The total order delivery is delivery in which the plurality of server devices 200 process requests in the same order. For example, the server devices 200 agree with the other server devices 200 in terms of the processing order of requests with a distributed agreement algorithm, such as the Paxos algorithm, and process the requests in the agreed order. Data processing by the data processing unit 240 is described later. Next, in Step S210, the capacity reservation portion 221 returns a response to the data transmission/reception unit 210 on the basis of the processing result by the order delivery unit 230.

<Data Processing>

Figure 11:
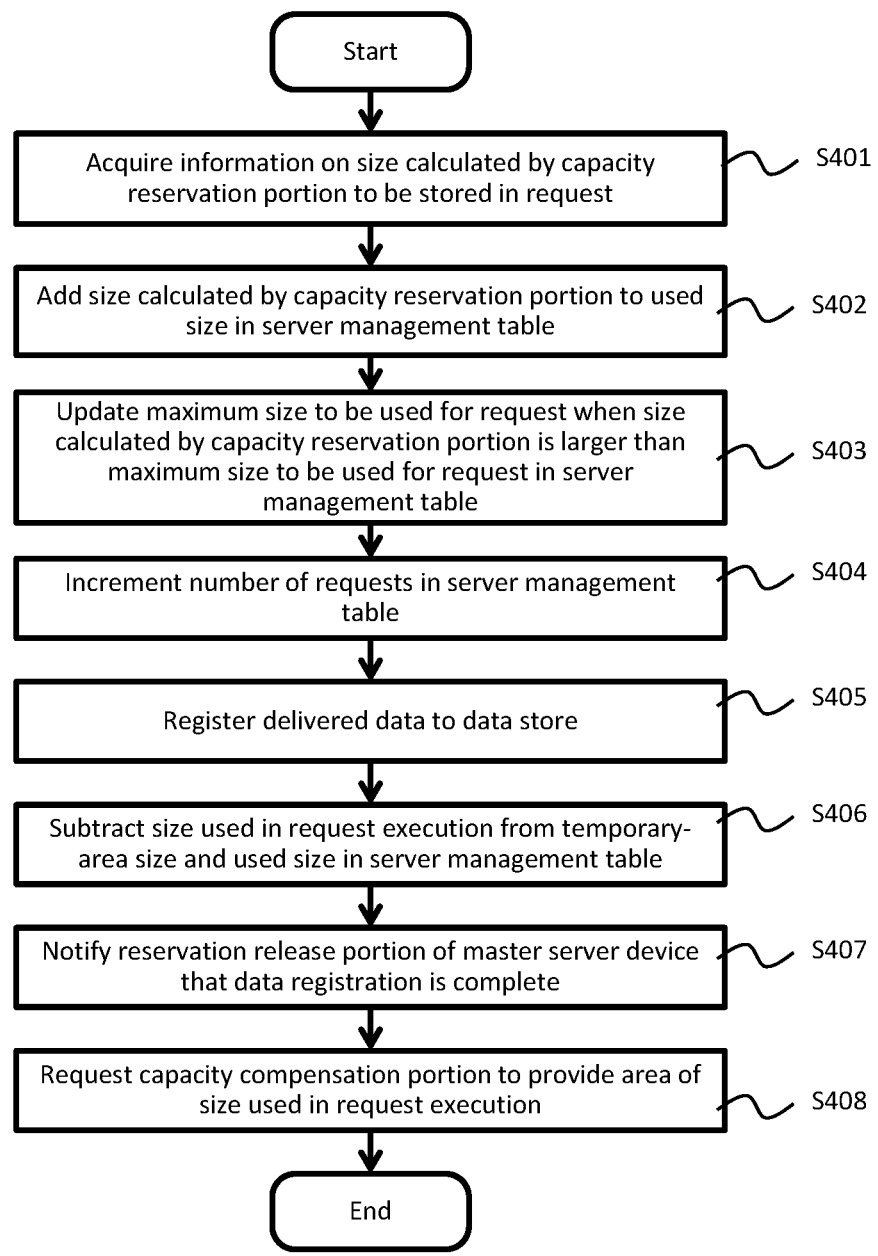
FIG. 11 is a flowchart of data processing by a data processing unit.

FIG. 11 is a flowchart of the data processing by the data processing unit. The data processing is processing that the data processing units 240 of both of the master server and the slave server execute.

In Step S401, the data processing unit 240 first acquires the information on the size obtained by the capacity reservation portion 221 in Step S202 to be stored in the request. Next, in Step S402, the data processing unit 240 adds the size obtained by the capacity reservation portion 221 and acquired by the data processing unit 240 in Step S401 to the used size 2A4 in the server management table 2A0. In addition, when the size obtained by the capacity reservation portion 221 and acquired by the data processing unit 240 in Step S401 is larger than the maximum request-use size 2A6, in Step S403, the data processing unit 240 updates the maximum request-use size 2A6 to the size obtained by the capacity reservation portion 221 and acquired by the data processing unit 240 in Step S401.

Next, in Step S404, the data processing unit 240 increments (+1) the number of requests 2A5 in the server management table 2A0. In addition, in Step S405, the data processing unit 240 registers the data delivered from the order delivery unit 230 to the data store 280. Here, when the server device 200 in question is the server device 200 that stores the master data in the range in which the data is stored, the data is stored as the master data. When the server device 200 in question is the server device 200 that stores the replica data in the range in which the data is stored, the data is stored as the replica data.

Next, in Step S406, the data processing unit 240 subtracts the size used in the request execution from both of the temporary-area size 2A3 and the used size 2A4 in the server management table 2A0. Next, in Step S407, the data processing unit 240 notifies the reservation release portion 222 of the server device 200 that is the master server that the data registration is complete, that is, the request execution is compete. Reservation release processing that the reservation release portion 222 executes is described later.

In addition, in Step S408, the data processing unit 240 requests the capacity compensation portion 223 of the server device 200 in question to compensate for the temporary area 720 with a storage area having a size used in the request execution. Capacity compensation processing that the capacity compensation portion 223 executes is described later.

Figure 12:
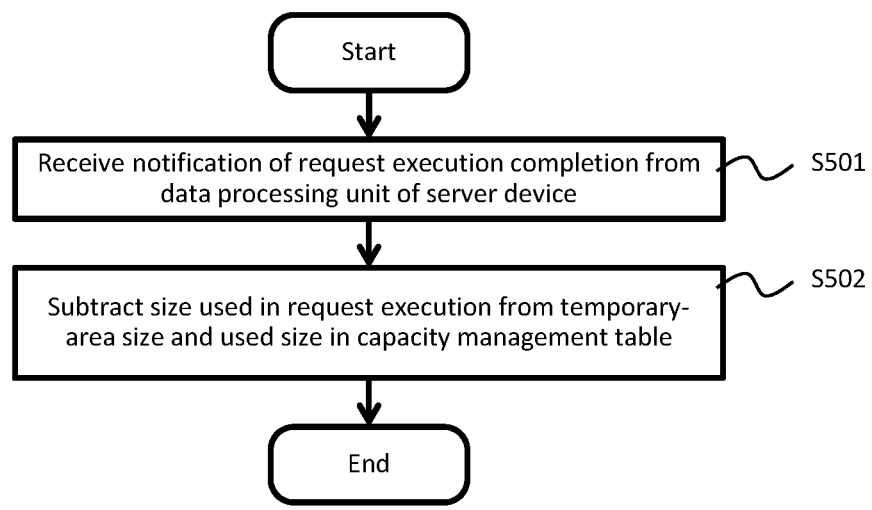
FIG. 12 is a flowchart of reservation release processing by a reservation release portion.

FIG. 12 is a flowchart of the reservation release processing by the reservation release portion. The reservation release processing is processing that the reservation release portion 222 of the master server executes.

In Step S501, the reservation release portion 222 first receives the notification of the request execution completion from the data processing unit 240 of the server device 200 in which the data registration is complete. Next, in Step S502, the reservation release portion 222 subtracts the size used in the request execution from both of the temporary-area size 292 and the used size 293 in the capacity management table 290. This is processing of releasing, on the capacity management table 290, the storage area reserved on the capacity management table 290 to be used in the request execution in Step S207.

Figure 13:
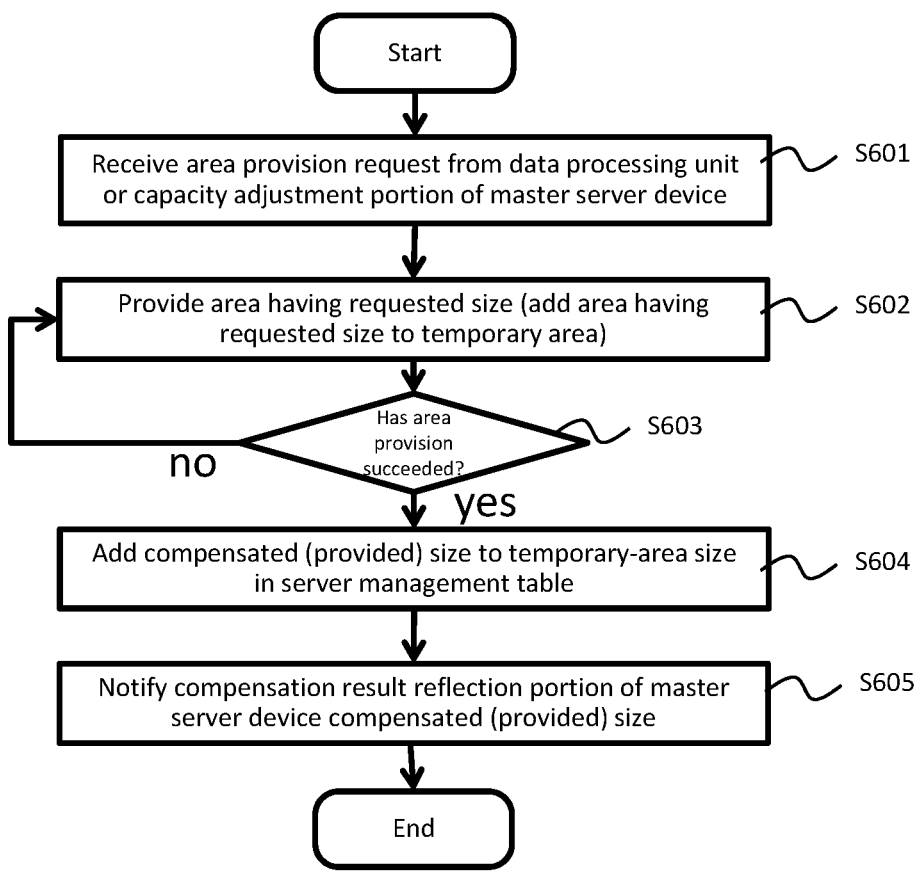
FIG. 13 is a flowchart of capacity compensation processing by a capacity compensation portion.

FIG. 13 is a flowchart of the capacity compensation processing by the capacity compensation portion. The capacity compensation processing is processing that the capacity compensation portions 223 of both of the master server and the slave server execute.

In Step S601, the capacity compensation portion 223 receives the request for providing the temporary area 720 from the data processing unit 240 of the server device 200 in question or the capacity adjustment portion 226 of the server device 200 that is the master server. Next, in Step S602, the capacity compensation portion 223 provides an area having the size requested to be provided in Step S601. Providing an area means compensating for the temporary area 720 with a storage area having a requested size from the data store 280 (adding the storage area to the temporary area 720).

Next, in Step S603, the capacity compensation portion 223 determines whether the compensation (provision) of the storage area having the size requested in Step S601 has succeeded or not. When the provision of the area has succeeded (yes in Step S603), in Step S604, the capacity compensation portion 223 adds, to the temporary-area size 2A3 in the server management table 2A0, the size of the provided area, that is, the size of the storage area with which the temporary area 720 has been compensated for. In addition, in Step S605, the capacity compensation portion 223 notifies the compensation result reflection portion 224 of the server device 200 that is the master server of the fact that the area has been provided and the size of the provided area. Compensation result reflection processing that the compensation result reflection portion 224 executes is described later.

Figure 14:
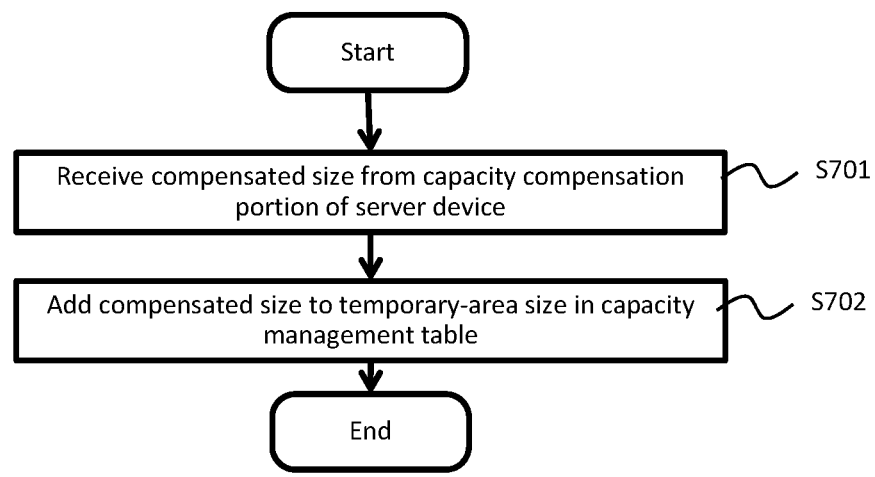
FIG. 14 is a flowchart of compensation result reflection processing by a compensation result reflection portion.

FIG. 14 is a flowchart of the compensation result reflection processing by the compensation result reflection portion. The compensation result reflection processing is processing that the compensation result reflection portion 224 of the master server executes.

In Step S701, the compensation result reflection portion 224 receives the size (compensation size) of the storage area with which the temporary area 720 has been compensated for from the capacity compensation portion 223 of the server device 200 that has compensated for the temporary area 720 with the storage area. Next, in Step S702, the compensation result reflection portion 224 adds the compensation size to the temporary-area size 292 in the capacity management table 290.

<Start Processing>

Figure 15:
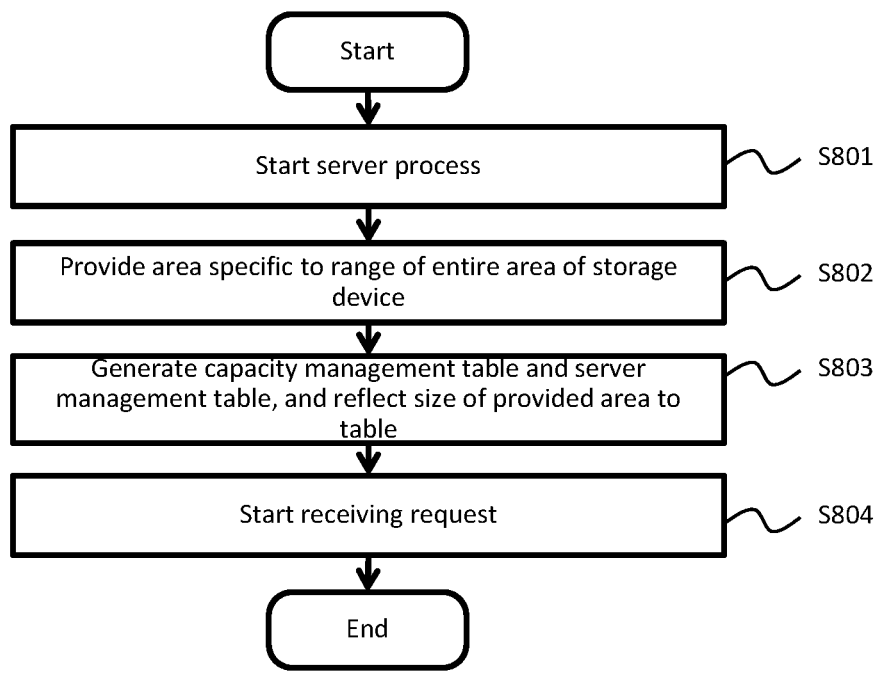
FIG. 15 is a flowchart of start processing by a start processing unit.

FIG. 15 is a flowchart of start processing by the start processing unit. The start processing is processing that the start processing units 250 of both of the master server and the slave server execute.

In Step S801, the start processing unit 250 starts a server process. The server process is a process for operation as the server device 200. In addition, in Step S802, the start processing unit 250 provides, to each range in which the storage area of the server device 200 in question is included, a storage area specific to the range of the entire area of the main storage device 530. Here, the main storage device 530 mainly provides the storage area, but the secondary storage device 540 may provide a part or entire of the storage area.

Next, in Step S803, the start processing unit 250 generates the capacity management table 290 and the server management table 2A0, and reflects information on the size of the provided storage area to each table. Specifically, information on the size of the storage area provided in Step S802 may be registered in the temporary-area size 292 in the capacity management table 290 and the temporary-area size 2A3 in the server management table 2A0. Next, in Step S804, the start processing unit 250 controls the server device 200 to start receiving requests.

<Failover Processing>

Figure 16:
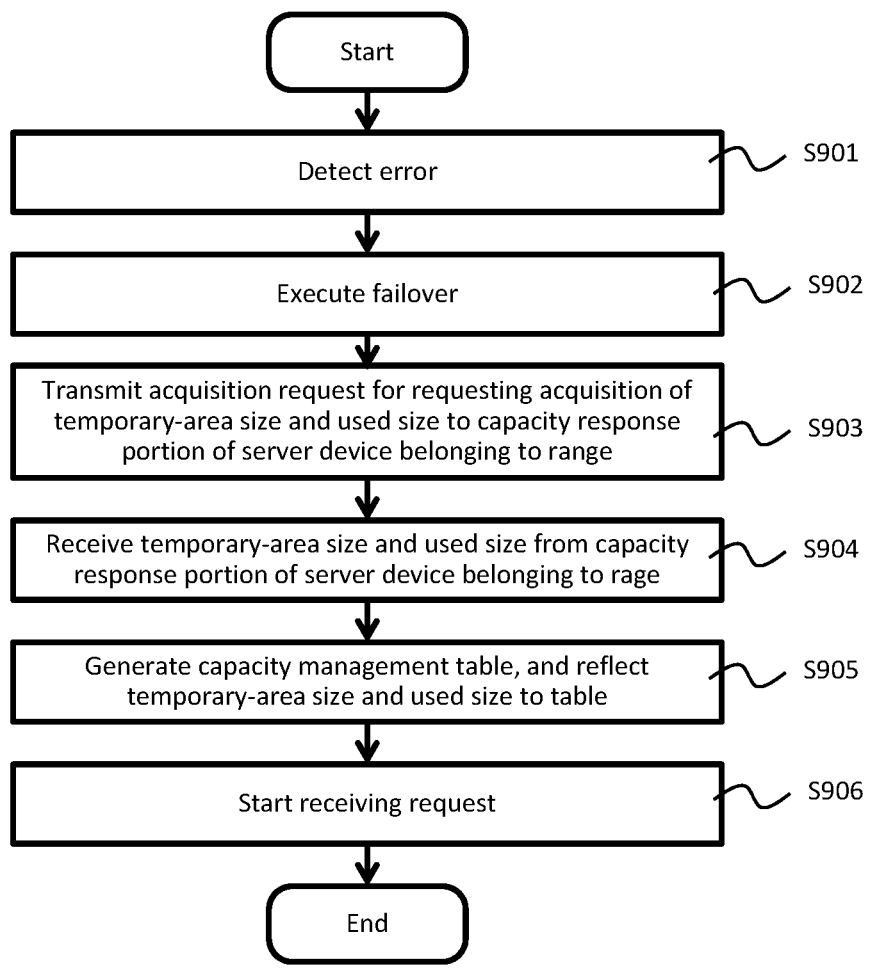
FIG. 16 is a flowchart of failover processing by a failover unit.

FIG. 16 is a flowchart of failover processing by the failover unit. The failover processing is processing that the failover unit 260 of the server device 200 that serves as a new master server when an error occurs in the master server belonging to the same range executes.

In Step S901, the failover unit 260 detects an error in the master server. Next, in Step S902, the failover unit 260 executes failover. Through the failover, the server device 200 in question takes over the role of the master server from the master server in which an error has occurred. Next, in Step S903, the failover unit 260 transmits an acquisition request for requesting acquisition of the temporary-area size 2A3 and the used size 2A4 to the capacity response portion 225 of each of the server devices 200 belonging to the range. Capacity response processing that the capacity response portion 225 executes here is described later.

Next, in Step S904, the failover unit 260 receives information on the temporary-area size 2A3 and the used size 2A4 from the capacity response portion 225 of each of the server devices 200 belonging to the range. Next, in Step S905, the failover unit 260 generates the capacity management table 290, and reflects the temporary-area size 2A3 and the used size 2A4 received from the capacity response portion 225 of the server device 200 belonging to the range to the temporary-area size 292 and the used size 293 in the capacity management table 290. When the processing ends, in Step S906, the failover unit 260 controls the server device 200 in question to start receiving requests.

Figure 17:
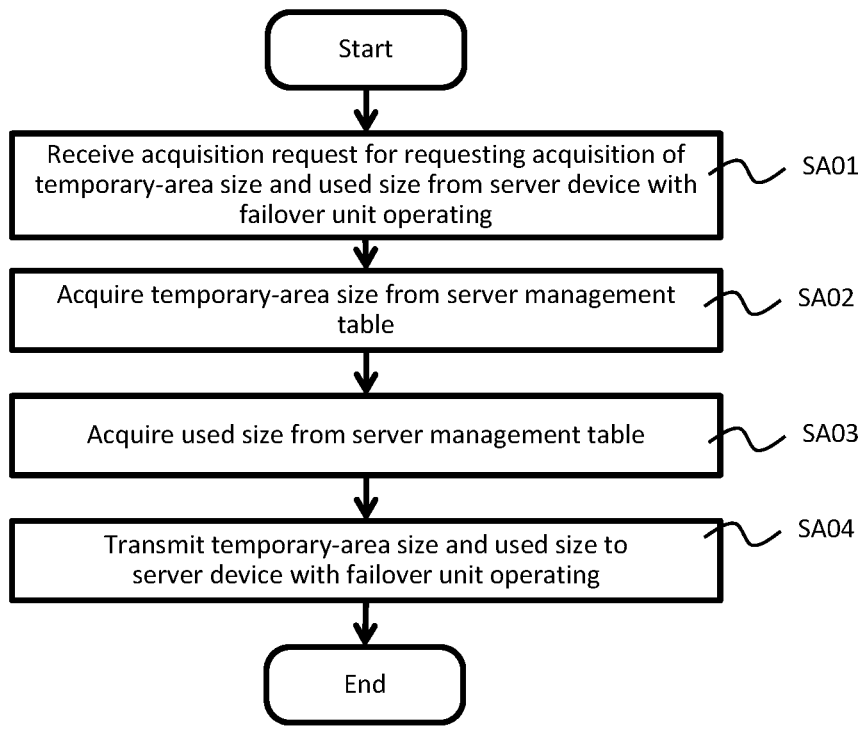
FIG. 17 is a flowchart of capacity response processing by a capacity response portion.

FIG. 17 is a flowchart of the capacity response processing by the capacity response portion. The capacity response processing is processing that the capacity response portions 225 of both of the master server and the slave server execute.

In Step SA01, the capacity response portion 225 receives, from the server device 200 that is executing the failover processing by the failover unit 260, the acquisition request for requesting acquisition of the temporary-area size 2A3 and the used size 2A4. Next, in Step SA02, the capacity response portion 225 acquires the temporary-area size 2A3 from the server management table 2A0. Subsequently, in Step SA03, the capacity response portion 225 acquires the used size 2A4 from the server management table 2A0. Finally, in Step SA04, the capacity response portion 225 transmits the temporary-area size 2A3 and the used size 2A4 acquired to the server device 200 that is executing the failover processing by the failover unit 260, that is, the server device 200 that has transmitted the acquisition request.

<Statistical Information Output Processing>

Figure 18:
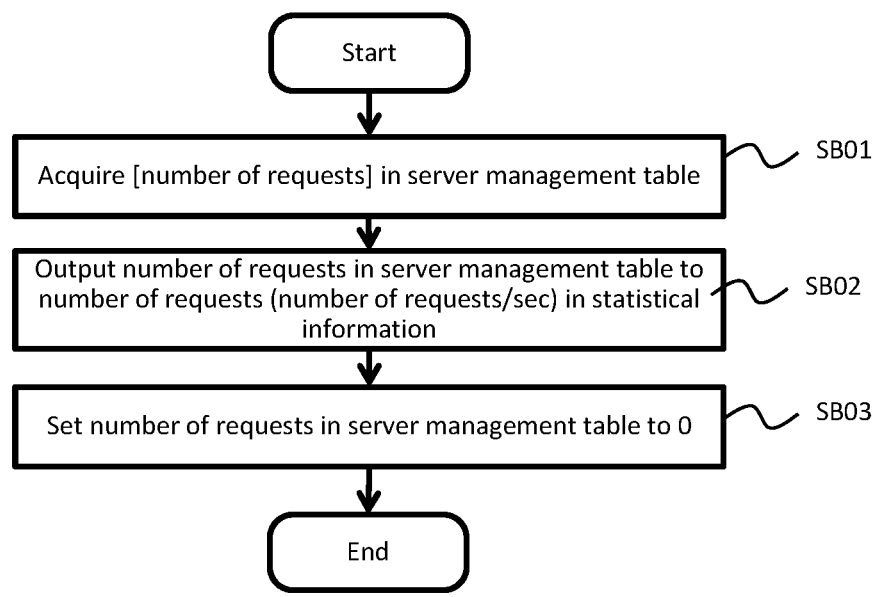
FIG. 18 is a flowchart of statistical information output processing by a statistical information output unit.

FIG. 18 is a flowchart of the statistical information output processing by the statistical information output unit. The statistical information output processing is processing that the statistical information output unit 270 of the master server executes.

The statistical information output unit 270 regularly executes the statistical information output processing at a certain cycle. In the present embodiment, the statistical information output unit 270 executes the statistical information output processing with one-second interval.

In Step SB01, the statistical information output unit 270 acquires the number of requests 2A5 in the server management table 2A0. Next, in Step SB02, the statistical information output unit 270 records the number of requests 2A5 in the server management table 2A0, which is acquired in Step SB01, in the number of requests (number of requests/sec) in the statistical information 2C0. In addition, in Step SB03, the statistical information output unit 270 sets (clears) the number of requests 2A5 in the server management table 2A0 to 0.

Figure 19:
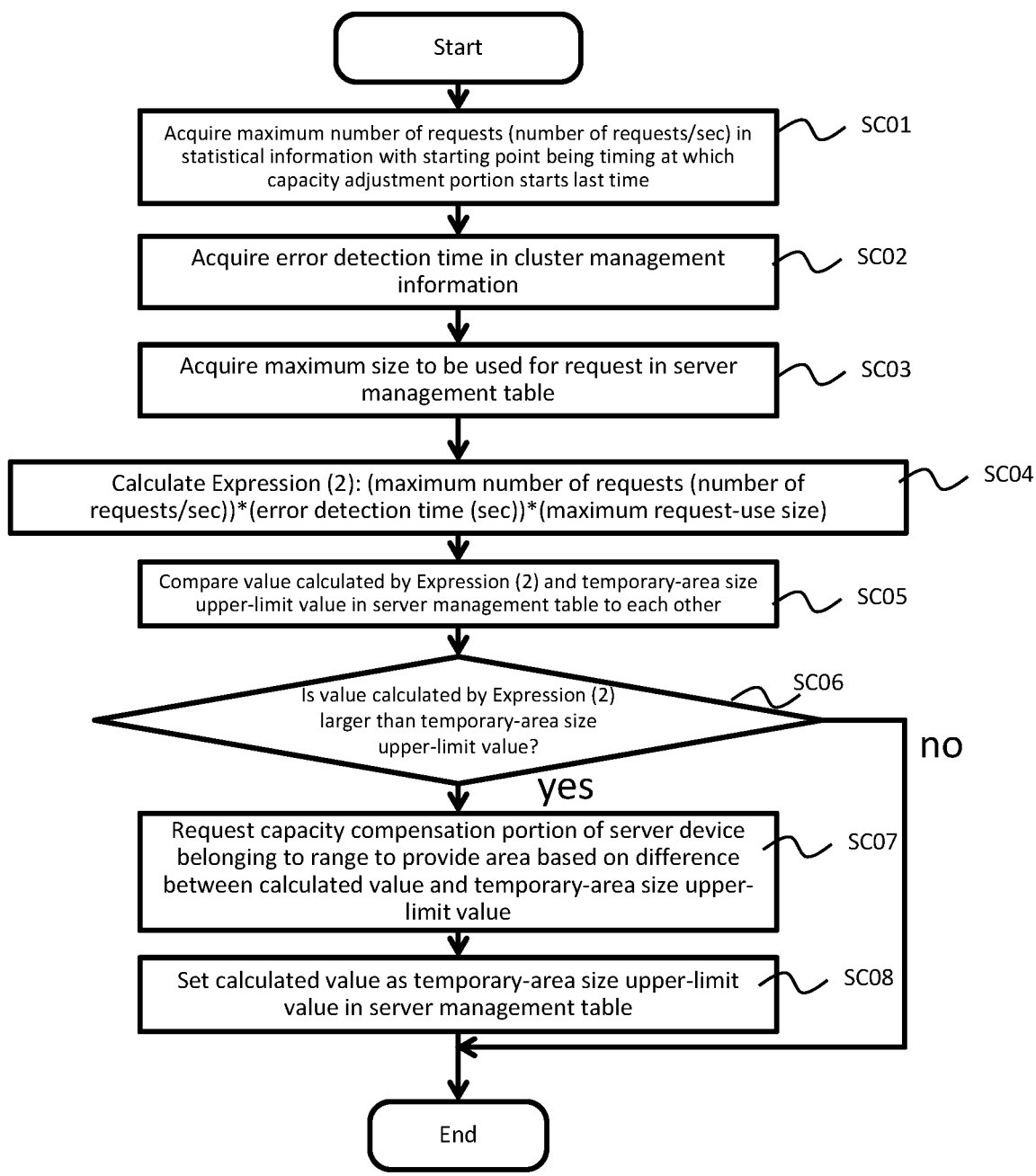
FIG. 19 is a flowchart of capacity adjustment processing by a capacity adjustment portion.

FIG. 19 is a flowchart of capacity adjustment processing by the capacity adjustment portion. The capacity adjustment processing is processing that the capacity adjustment portion 226 of the master server executes.

The capacity adjustment portion 226 executes the capacity adjustment processing at a certain cycle. The period of the capacity adjustment processing is set to time longer than that of the period of the statistical information output processing.

In Step SC01, the capacity adjustment portion 226 first acquires the maximum value of the number of requests (number of requests/sec) in the statistical information 2C0 with a starting point being timing at which the previous capacity adjustment processing has been executed. In the present embodiment, the number of requests in the statistical information 2C0 is record per second, and hence the capacity adjustment portion 226 may acquire the maximum number of requests of the numbers of requests record after the previous capacity adjustment processing has been executed.

Next, in Step SC02, the capacity adjustment portion 226 acquires the error detection time 2B1 in the cluster management information 2B0. In addition, in Step SC03, the capacity adjustment portion 226 acquires the maximum request-use size 2A6 in the server management table 2A0.

Next, in Step SC04, the capacity adjustment portion 226 calculates, by Expression (2), a size of the temporary area 720 that may be used in the error detection time.

(Size of temporary area 720 that may be used in error detection time)=(maximum number of requests(number of requests/sec))*(error detection time(sec))*(maximum request-use size) (2)

Next, in Step SC05, the capacity adjustment portion 226 compares the value calculated by Expression (2) above and the temporary-area size upper-limit value 2A2 in the server management table 2A0 to each other. When the value calculated by Expression (2) is equal to or smaller than the temporary-area size upper-limit value 2A2 in the server management table 2A0 (no in Step SC06), the capacity adjustment portion 226 ends the capacity adjustment processing.

When the value calculated by Expression (2) is larger than the temporary-area size upper-limit value 2A2 in the server management table 2A0 (yes in Step SC06), in Step SC07, the capacity adjustment portion 226 sends, to the capacity compensation portion 223 of each of the server devices 200 belonging to the range, a provision request for requesting provision of the temporary area 720 based on a difference between the value calculated by Expression (2) and the temporary-area size upper-limit value 2A2.

In addition, in Step SC08, the capacity adjustment portion 226 sets the value calculated by Expression (2) as a new value of the temporary-area size upper-limit value 2A2 in the server management table 2A0.

<Overall Flow>

The configuration and the operation of the server device 200 of the information system in the present embodiment described so far can be summarized as follows.

The information system is a computer system for allocating master data and replica data that is reproduction of the master data in the plurality of server devices in a distributed manner, and includes the capacity management unit 220 and the data processing unit 240.

The capacity management unit 220 configures the storage area management range covering the plurality of server devices 200 as a range, and provides in advance, in each range, the temporary area 720 for dynamic control of the total capacity to the master server that is the server device 200 in which the master data is allocated and the slave server that is the server device 200 in which the replica data is allocated. Further, the capacity management unit 220 manages the use status of the temporary area 720 of each of the master server and the slave server with the capacity management table 290, and determines whether a data write request for requesting writing of data is executable or not on the basis of the use status of the temporary area 720 of the master server and the use status of the temporary area 720 of the slave server in the capacity management table 290 of a range to which the data requested to be written by the data write request belongs.

The data processing unit 240 causes both of the master server and the slave server to execute the data write request when the capacity management unit 220 determines that the data write request is executable.

The temporary area of the master server that is used by the master data and the temporary area of the slave server that is used by the replica data are collectively managed with the capacity management table 290, and whether the request is executable or not is determined on the basis of the use statuses of the temporary areas of the master server and the slave server in the capacity management table 290, with the result that even when the master server and the slave server have different free capacities, the request that succeeds in one server can also succeed in another server and the request that fails in one server can also fail in another server on the basis of the determination result. This means improvement of data consistency.

Further, the capacity management unit 220 determines that the data write request is executable when the capacity management table 290 indicates that the temporary area 720 of each of the master server and the slave server has a free capacity enough to write the data of the data write request. The capacity management unit 220 determines that the data write request is inexecutable when either one or both of the temporary area 720 of the master server and the temporary area 720 of the slave server do not have a free capacity enough to write the data of the data write request.

The data write request is determined to be executable when the temporary areas of both of the master server and the slave server have free capacities enough to write the data, and hence even when the master server and the slave server have different free capacities, the request that succeeds in one server can also succeed in another server and the request that fails in one server can also fail in another server on the basis of the determination result. This means improvement of data consistency.

Further, the capacity management unit 220 waits, when either one or both of the temporary area 720 of the master server and the temporary area 720 of the slave server have a shortage of the free capacity with respect to the data write request in the capacity management table 290, until execution of a preceding request that has been issued before the data write request is complete, and determines that the data write request is executable when the preceding request is complete and the shortage of the free capacity is thus eliminated.

The request is determined to be executable when the preceding request is complete and the shortage of the free capacity is thus eliminated, and hence the request can be executed more often.

Further, the order delivery unit 230 causes the master server and the slave server to execute the data write request so that the master server and the slave server execute the data write request in the same order.

Even under a state where either one of the server devices 200 that are the master server and the slave server has a capacity shortage, the execution order of the request and data consistency between the server devices can be maintained.

Further, the temporary area 720 of the server device 200 is provided by the main storage device 530. Even when capacity shortage occurs in the main storage device 530 that becomes relatively expensive when it is provided with a sufficient margin of capacity, consistency between the server devices 200 can be ensured.

Further, the capacity management unit 220 reserves, when the data write request is issued, the storage area of the temporary area 720 to be used for execution of the data write request on the capacity management table 290 before the data write request is executed, and releases, when the data write request is executed, the storage area reserved to be used for execution of the data write request on the capacity management table 290.

The data write request is executed after the storage capacity is reserved on the capacity management table 290, and hence the server devices 200 do not need to communicate with each other to check the capacities during execution of the data write request, with the result that the high-speed system operation can be maintained.

Further, the capacity management unit 220 measures storage capacities used for executing requests in past request execution, and controls the total capacity of the temporary area 720 on the basis of the statistical information in which pieces of information on the storage capacities are accumulated.

An area that is provided to each range has a value adjusted on the basis of the storage capacities used for the past data write requests, and hence the data write request can be prevented from being inexecutable. Further, provision of an excess capacity of the temporary area 720 is prevented, and hence another range can be provided with an area without problems.

Further, the capacity management unit 220 controls, on the basis of the statistical information, the total capacity of the temporary area 720 to be a capacity obtained by multiplying together the past maximum number of requests issued per unit of time, predetermined time (error detection time), and the maximum capacity used for one request.

The temporary area 720 with the storage capacity that is required for the case where the requests issued by the maximum number have each used the maximum capacity in the past in the statistical information can be provided, and hence the occurrence of the shortage of the temporary area 720 can be prevented.

Further, when an error occurs in the master server and the slave server serves as a new master server, the capacity management unit 220 generates the capacity management table 290 in the new master server.

When an error occurs in the master server and another server takes over the role of the master server in the range, the capacity management in the range can be continued.

The above-mentioned embodiment of the present invention is an example for description of the present invention, and the scope of the present invention is not intended to be limited to the embodiment. Persons skilled in the art can implement the present invention as various aspects without departing from the gist of the present invention.

REFERENCE SIGNS LIST

100 Client device
110 Data transmission/reception unit
200 Server device
210 Data transmission/reception unit
220 Capacity management unit
221 Capacity reservation portion
222 Reservation release portion
223 Capacity compensation portion
224 Compensation result reflection portion
225 Capacity response portion
226 Capacity adjustment portion
230 Order delivery unit
240 Data processing unit
250 Start processing unit
260 Failover unit
270 Statistical information output unit
280 Data store
300 Communication network
510 CPU
520 Network interface
530 Main storage device
540 Secondary storage device
550 Bus

The invention claimed is:

1. A computer system configured to allocate master data and replica data that is reproduction of the master data in a plurality of server devices in a distributed manner, the computer system comprising:
   a memory; and
   a processor in communication with the memory, the memory storing a program executable by the processor to cause the processor to:
   configure a storage area management range covering the plurality of server devices as a range;
   provide in advance, in the range, a temporary area for dynamic control of a total capacity to a master server that is one of the plurality of server devices in which the master data is allocated and a slave server that is one of the plurality of server devices in which the replica data is allocated;
   manage a use status of the temporary area of each of the master server and the slave server with a capacity management table;
   determine whether a data write request for requesting writing of data is executable or not based on the use status of the temporary area of the master server and the use status of the temporary area of the slave server in the capacity management table of a range to which the data requested to be written by the data write request belongs;
   cause both of the master server and the slave server to execute the data write request when the processor determines that the data write request is executable; and
   prevent both of the master server and the slave server from executing the data write request when the data write request is determined to be inexecutable.

2. The computer system according to claim 1, wherein the processor is configured to determine that the data write request is executable when the capacity management table indicates that the temporary area of each of the master server and the slave server has a free capacity enough to write the data of the data write request, and the processor is configured to determine that the data write request is inexecutable when either one or both of the temporary area of the master server and the temporary area of the slave server do not have a free capacity enough to write the data of the data write request.

3. The computer system according to claim 2, wherein the processor is configured to wait, when either one or both of the temporary area of the master server and the temporary area of the slave server have a shortage of the free capacity with respect to the data write request in the capacity management table, until execution of a preceding request that has been issued before the data write request is complete, and determine that the data write request is executable when the preceding request is complete and the shortage of the free capacity is thus eliminated.

4. The computer system according to claim 1, wherein the processor is configured to cause the master server and the slave server to execute the data write request so that the master server and the slave server execute the data write request in the same order.

5. The computer system according to claim 1, wherein the temporary area of each of the server devices is provided by a main storage device.

6. The computer system according to claim 1, wherein the processor is configured to reserve, when the data write request is issued, a storage area of the temporary area to be used for execution of the data write request on the capacity management table before the data write request is executed, and release, when the data write request is executed, the storage area reserved to be used for execution of the data write request on the capacity management table.

7. The computer system according to claim 1, wherein the processor is configured to measure storage capacities used for executing requests in past request execution, and control the total capacity of the temporary area based on statistical information in which pieces of information on the storage capacities are accumulated.

8. The computer system according to claim 7, wherein the processor is configured to cause, based on the statistical information, the total capacity of the temporary area to be a capacity obtained by multiplying together a past maximum number of requests issued per unit of time, predetermined time, and a maximum capacity used for one request.

9. The computer system according to claim 1, wherein the processor is configured to generate, when an error occurs in the master server and the slave server serves as a new master server, the capacity management table in the new master server.

10. A data processing method for a computer system that allocates master data and replica data that is reproduction of the master data in a plurality of server devices in a distributed manner, the data processing method comprising:
   configuring, by capacity management means, a storage area management range covering the plurality of server devices as a range;
   providing in advance, by the capacity management means, in the range, a temporary area for dynamic control of a total capacity to a master server that is one of the plurality of server devices in which the master data is allocated and a slave server that is one of the plurality of server devices in which the replica data is allocated;
   managing, by the capacity management means, a use status of the temporary area of each of the master server and the slave server with a capacity management table;
   determining, by the capacity management means, whether a data write request for requesting writing of data is executable or not based on the use status of the temporary area of the master server and the use status of the temporary area of the slave server in the capacity management table of a range to which the data requested to be written by the data write request belongs;
   causing, by data processing means, both of the master server and the slave server to execute the data write request when the data write request is determined to be executable; and
   preventing, by the data processing means, both of the master server and the slave server from executing the data write request when the data write request is determined to be inexecutable.

* * * * *